(12) United States Patent
Hamburgen et al.

(10) Patent No.: US 9,746,664 B1
(45) Date of Patent: Aug. 29, 2017

(54) MEMS-BASED DISPLAY WITH HIGH-STRENGTH COVER GLASS

(71) Applicant: GOOGLE INC., Mountain View, CA (US)

(72) Inventors: William Riis Hamburgen, Los Altos, CA (US); Ken Foo, Sunnyvale, CA (US); Kevin Tom, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/734,886

(22) Filed: Jun. 9, 2015

Related U.S. Application Data

(60) Provisional application No. 62/009,904, filed on Jun. 9, 2014.

(51) Int. Cl.
| | |
|---|---|
| *G02B 26/04* | (2006.01) |
| *G06F 3/041* | (2006.01) |
| *F21V 8/00* | (2006.01) |
| *G02B 1/14* | (2015.01) |

(52) U.S. Cl.
CPC ............. *G02B 26/04* (2013.01); *G02B 1/14* (2015.01); *G02B 6/0068* (2013.01); *G06F 3/041* (2013.01)

(58) Field of Classification Search
CPC ........ G02B 26/02; G02B 26/04; G02B 26/08; G02B 26/0833; G02B 26/0858; G02B 26/16; G02B 27/0006; G02B 1/14; G02B 6/005; G02B 6/0068; G02B 6/0073; G02B 2027/014; G02B 23/22; G02B 23/2476; G02B 7/00; G02B 7/02; G02B 7/20; G02B 7/28; G09G 3/00; G09G 3/20; G09G 3/2003; G09G 3/2007; G09G 3/2029; G09G 3/2085; G09G 3/2092; G09G 3/22; G09G 3/3208; G09G 3/3233; G09G 3/3241;
(Continued)

(56) References Cited

U.S. PATENT DOCUMENTS

| | | | |
|---|---|---|---|
| 2014/0355126 A1* | 12/2014 | Gutierrez | G02B 1/11 359/609 |
| 2015/0084928 A1* | 3/2015 | Wyrwas | G06F 3/0421 345/175 |

* cited by examiner

*Primary Examiner* — Scott J Sugarman
*Assistant Examiner* — Ibrahima Diedhiou
(74) *Attorney, Agent, or Firm* — Brake Hughes Bellermann LLP

(57) ABSTRACT

An apparatus includes one or more light sources configured to provide light having at least three different colors and a backlight layer configured for diffusing the light. A MEMS-based shutter layer includes a plurality of pixel elements having shutters programmably controlled to allow light from the backlight layer to pass through the shutter layer when the MEMS-based shutter is in an open configuration and to block light from passing through the shutter layer when in a closed configuration. A processor is configured to control the provision of the different colored light from the one or more light sources to the backlight layer and configured to control the passage of light from the backlight layer through the plurality of pixel elements to provide a predetermined image on the display apparatus. A hard, scratch resistant cover glass layer is stacked above the MEMS-based shutter layer. The MEMS-based shutter layer is stacked above the backlight layer without any intermediate layer between it and the backlight layer, and the cover glass layer is stacked above the MEMS-based shutter layer without any intermediate layer between the shutter layer and the cover glass layer.

18 Claims, 5 Drawing Sheets

(58) Field of Classification Search
CPC ........ G09G 3/325; G09G 3/3258; G09G 3/34; G09G 3/3406; G09G 3/3413; G09G 2300/023; G09G 2300/0434; G09G 2300/0439; G09G 2300/0443; G09G 2300/0447; G09G 2300/0452; G09G 2300/0456; G09G 2300/046; G09G 2300/0465; G09G 2300/0469; G09G 2300/0473; G09G 2300/0478; G09G 2300/0482; G09G 2300/0486; G09G 2300/0491; G09G 2300/06; G09G 2300/08; G09G 2300/0804; G09G 2300/0809; G09G 2300/0814; G09G 2300/0819; G09G 2300/0828; G09G 2300/0833; G09G 2300/0838; G09G 2300/0842; G09G 2300/0847; G09G 2300/0852; G09G 2300/0857; G09G 2300/0861; G09G 2300/0866; G09G 2300/0871; G09G 2300/0876; G09G 2300/088; G09G 2300/0885; G09G 2300/089; G09G 2300/0895; G09G 2310/00; G09G 2310/02; G09G 2310/02; G09G 2330/02; G09G 2330/021; G09G 2330/022; G09G 2330/023; G09G 2330/024; G09G 2340/06; G09G 2360/16; G02F 1/1336; G02F 1/133602; G02F 1/133603; G02F 1/133604; G02F 1/133605; G02F 1/133606; G02F 1/133608; G02F 1/133609; G02F 1/133611; G02F 1/133615; G02F 1/133617; G02F 1/13362; G02F 1/133621; G02F 1/133633; G02F 1/133632; G02F 1/133634; G02F 1/133636; G02F 1/1368; G02F 1/133308; G02F 1/13338; G02F 1/133514; C09K 11/06; H04B 1/385; G06T 1/20; G06T 15/005; G06T 15/80; G06T 2210/52; G01N 21/65; H01L 27/3211; H01L 27/3213; H01L 27/3216; H01L 27/3218; H01L 27/323; H01L 33/00; H01L 51/5246; H01L 2924/1461; B32B 2457/20; B32B 2457/208; B32B 2255/00; B81B 2201/047; H01M 2/02; H01M 2/0202; H01M 2/0227
USPC ........ 359/230, 513; 345/24, 77, 184, 85, 87, 345/88, 102, 173, 175, 204, 212, 501, 345/589, 690, 692; 156/278; 362/97.1, 362/607, 612, 613; 429/163
See application file for complete search history.

MEMS-BASED DISPLAY WITH HIGH-STRENGTH COVER GLASS

CROSS-REFERENCE TO RELATED APPLICATIONS

This application claims priority under 35 U.S.C. §119(e)(1), to U.S. Provisional Application Ser. No. 62/009,904, filed on Jun. 9, 2014, the entire contents of which are incorporated herein.

TECHNICAL FIELD

This description relates to display devices and, in particular, to a MEMS-based display with a high-strength cover glass.

BACKGROUND

Liquid crystal display (LCD) devices are used in a variety of applications, such as in televisions, computer monitor display devices, tablet display devices, mobile phones, and smart phone displays. They are energy efficient when compared with other types of displays, and they can be thinner than many other types of displays. Most LCDs include a layer of liquid crystal molecules aligned between two transparent electrodes, and two polarizing filters. Light from a light source is provided to the LCD, and the amount of light from the source that passes through the LCD can be controlled by controlling an electric field between the two transparent electrodes, which, in turn, controls the orientation of the liquid crystal molecules and therefore the amount of light that passes through the LCD.

An LCD device can include many individually-controllable pixel elements. By controlling the amount of light that is transmitted through each element, an image can be defined by the LCD device. In addition, the pixel elements may include multiple different color filters, where the amount of white light passing through each filter can be individually-controlled, so that the LCD device can render a color image.

The amount of light that is transmitted through each pixel element of an LCD device can be controlled in a variety of ways. For example, the opacity of individual color filters of individual pixels can be controlled to create different colors, and different brightnesses, at the locations of different pixels of the device. In addition, the intensity of the backlight that supplies light to the LCD can be varied to control the maximum brightness that can be achieved at a pixel element that is illuminated by the backlight. Bright backlight intensities may permit the LCD device to achieve a high dynamic range of colors and brightnesses that can be produced in an image displayed to a viewer. However, the amount of light that is ultimately passed through the polarizing layers and color filter layers of the LCD display to a viewer of the display compared with the amount of light produced by the backlight can be relatively small, which results in high power consumption by the device that uses the display.

Another approach to displays used in televisions, computer displays, phone displays, etc. involves the use of field-sequential systems that rely on MEMS ("microelectromechanical systems") technology to pass different color components of white light through pixel elements of the display. By controlling the amounts of the different color components that are passed through a pixel element and by cycling through the different color components at a rate that is fast compared to the response rate of human vision, a color of a pixel element can be controlled. MEMS shutters that have a size on the order of the size of a pixel element of the display can opened and closed to selectively allow different amounts of the different color components to pass through the pixel element. Until recently, the rate at which MEMS shutters could be opened and closed limited the quality of field-sequential displays, because when the shutters could not open and close fast enough compared to the response rate of human vision, a person would see annoying color fringes in the display when moving their eyes with respect to the display. However, recent advances in MEMS-based shutters—specifically, the rate at which they can be opened and closed—have improved the quality of field-sequential displays.

SUMMARY

According to one general aspect, an apparatus includes a backlight layer configured for diffusing light received into the backlight layer and one or more light sources configured to provide light having at least three different colors to the backlight layer. A MEMS-based shutter layer includes a plurality of pixel elements, each pixel element being is associated with at least one MEMS-based shutter that is programmably controlled to allow light from the backlight layer to pass through the shutter layer when the MEMS-based shutter is in an open configuration and to block light from the backlight layer from passing through the shutter layer when the MEMS-based shutter is in a closed configuration. A processor is configured to control the provision of the different colored light from the one or more light sources to the backlight layer and configured to control, in co-ordination with the control of the provision of the different colored light, the passage of light from the backlight layer through the plurality of pixel elements to provide a predetermined image on the display apparatus. A hard, scratch resistant cover glass layer is stacked above the MEMS-based shutter layer. The MEMS-based shutter layer is stacked above the backlight layer without any intermediate layer between the MEMS-based shutter layer and the backlight layer that is configured to polarize light from the backlight layer, and the cover glass layer is stacked above the MEMS-based shutter layer without any intermediate layer between the MEMS-based shutter layer and the cover glass layer that is configured to filter constituent spectral ranges of light from the backlight layer.

In another general aspect, a computing device includes a display, having a backlight layer configured for diffusing light received into the backlight layer, one or more light sources configured to provide light having at least three different colors to the backlight layer, a MEMS-based shutter layer that includes a plurality of pixel elements, each pixel element being is associated with at least one MEMS-based shutter that is programmably controlled to allow light from the backlight layer to pass through the shutter layer when the MEMS-based shutter is in an open configuration and to block light from the backlight layer from passing through the shutter layer when the MEMS-based shutter is in a closed configuration, the MEMS-based shutter layer being mechanically coupled to the backlight layer, and a hard, scratch resistant cover glass layer stacked above the MEMS-based shutter layer, the cover glass layer being mechanically coupled to the MEMS-based layer. The MEMS-based shutter layer is stacked above the backlight layer without any intermediate layer between the MEMS-based shutter layer and the backlight layer that is configured to polarize light from the backlight layer, and the cover glass layer is stacked above the MEMS-based shutter layer without any intermediate layer between the MEMS-based shutter layer and the cover glass layer that is configured to filter constituent spectral ranges of light from the backlight layer. The device also includes a housing, with the cover glass layer being mechanically coupled to the housing to secure the cover glass layer in the housing, and a processor configured to control the provision of the different colored light from the one or more light sources to the backlight layer and configured to control, in co-ordination with the control of the provision of the different colored light, the passage of light from the backlight layer through the plurality of pixel elements to provide a predetermined image on the display.

BRIEF DESCRIPTION OF THE DRAWINGS

Like reference symbols in the various drawings indicate like elements.

DETAILED DESCRIPTION

Figure 1:
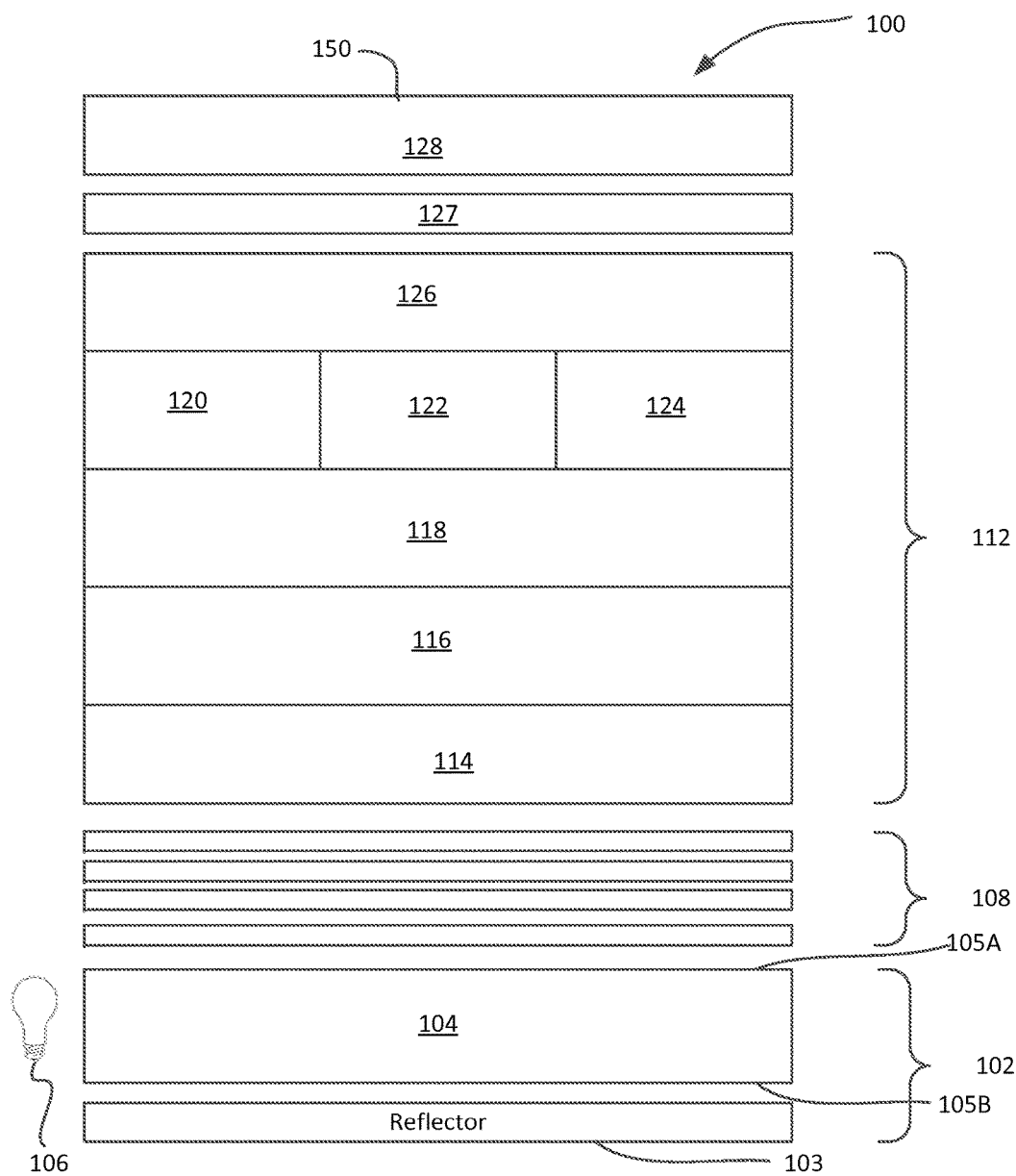
FIG. 1 is an example cross-sectional schematic diagram of pixel element of an LCD device.

FIG. 1 is an example cross-sectional schematic diagram of pixel element of an LCD device 100. The pixel element can include a backlight section 102 and an LCD section 112. The backlight section 102 can include a transparent light guide panel (LGP) 104 that can include glass, plastic, polymer, etc. material, which can transmit or guide light from an edge- or rear-mounted light source 106. In the example implementation shown in FIG. 1, the light source 106 is edge-mounted, in that the light source is mounted proximate to an edge of the LGP 106, so that the light from the source 106 is coupled into the LGP 104 through an edge of the LGP and can traverse the LGP to a top surface LGP which can include a reflecting surface 105A to re-direct light impinging on the surface 105A back into the LGP 104. Light can also strike a bottom surface 105B of the LGP, where the bottom surface 105B can include a reflecting surface to re-direct light impinging on the surface 105B back into the LGP 104. Light that escapes through the bottom surface 105B can be reflected by a reflector 103 and redirected into the LGP 104. In an example back-lit implementation (not shown), the light source 106 can be mounted proximate to the bottom surface 105B of the LGP 104 and coupled through the bottom surface into the LGP. In the backlit implementation, both side surfaces of the LGP can include reflecting surfaces to redirect light into the LGP 104.

The LGP 104 is coupled to a film stack 108 of different layers of material that have different indices of refraction and that extracts light from the LGP and direct the light toward the display surface 150 of the LCD pixel element 100. The top surface 105A or the bottom surface 105B of the LGP 104 can be roughened, pitted, dimpled, molded, etc., where the surface features are defined on a scale that is selected to scatter light in the LGP 104 uniformly out of the LGP and into the film stack 108. The film stack 108 includes transparent material that transmits light to the LCD section 112. The film stack 108 can include a multi-layered optical film stack that includes a diffusing layer, prisms and other optical elements that control the light to create a substantially homogeneous intensity profile of the light over the display surface 150 of the pixel element 100 and over the display surfaces of many pixel elements that make up a display device.

The LCD section 112 can include a rear polarizer 114, an addressing structure 116 that may include thin film transistors (TFTs) disposed on a transparent plate, a liquid crystal material layer 118, color filters (e.g., red, green, and blue filters) 120, 122, 124 on a transparent plate, and a front polarizer 126. The perimeter of the transparent plate on which the color filters are disposed can be bonded to the transparent plate on which the TFTs are disposed. Because of the need to precisely align the TFTs of individual pixel elements with color filters of the individual pixel elements within the entire surface of the display, the material used in the transparent layers for supporting the color filters and the TFTs is usually similar, so that the material properties (e.g., the coefficients of thermal expansion) of the different layers are very similar. Then, once the TFTs and the color filters are precisely aligned, the alignment can be maintained during fluctuations of environmental parameters. The LCD section 112 of a display, which can include thousands or millions of individual pixel elements, can be joined to the film stack layer 108 and the backlight layer 102 (e.g. by adhesive materials or by a mechanical framework of fastening).

A protective glass layer 128 can be placed over the LCD section 112 and can be coupled to the LCD section. In some implementation, the coupling of the glass layer 128 to the LCD section 112 is through an air gap between the two layers. In some implementations, the coupling is through an optically clear adhesive material 127 that mechanically connects the two layers. The protective glass layer 128 does not need to be carefully aligned with features of individual pixel elements and therefore does not need to be made of material similar to that of the transparent layers that support the color filters and the TFTs in the LCD section 112. Therefore, the protective glass layer 128 can be made of hardened glass that resists scratching and breakage and may include other features, such as an anti-reflection coating or an anti-smudge coating. The protective glass layer 128 also can include touch-sensitive elements, so that the device 100 can be used as in a device having a touch-sensitive display (e.g., a smartphone, a tablet, monitor, etc.).

As light traverses, and reflects within, the LGP 104, it can be scattered into the film stack 108 and then propagate upward though the pixel element 100. The light is polarized by the rear polarizer 114 and then enters the liquid crystal material layer 118. The TFTs in the addressing structure 116 control the amount of charge between different regions of the addressing structure 116 and the color filters 120, 122, 124, and the amount of charge determines the degree to which long molecules in the liquid crystal material layer 116 are oriented in such a manner as to act as a selective polarization region that, in conjunction with rear polarizer 114 prevents light from reaching one or more of the color filters 120, 122, 124. In this way, the amount of light that is allowed to pass into the individual color filters 120, 122, 124 is controlled. The color filters 120, 122, 124 filter the light passing through them, and the light is then repolarized by the front polarizer 126, whereupon it passes though the cover glass 128 of the display.

A variety of different color schemes can be implemented with the color filters. For example, in one implementation, red, green, and blue color filters can be used in combination to produce a wide variety of different colors. Four-color schemes can also be used, and may produce a wider dynamic range of colors than a three-color scheme. For example, a yellow color filter can be added to supplement the red, green, and blue color filters.

The light source 106 can include one or more LEDs that emit white light. White LEDs can be LEDs that natively emit light primarily in the blue end of the color spectrum but which are coated with a phosphor material, such that the light emitted from the coated LED is a broad-spectrum white color. In another implementation, the light source 106 can include multiple LEDs that emit light at different wavelengths (e.g., red, green, and blue). When the size of pixel elements is made smaller and smaller in an effort to increase the resolution of the display, i.e., to increase the number of pixels per square inch on the display, then a lower percentage of light from the source 106 is available for each pixel element. Thus, increasing the intensity of the light from the source 106, increasing the amount of light that is coupled from the source 106 into the LGP 104, and increasing the amount of light that is coupled from the LGP 104, through the film stack 108, and into the color filters 120, 122, 124 can be desirable.

In some implementations, the light sources 106 that produce white light can include LEDs that each emit white light. In some implementations, the light sources 106 that produce white light can include multiple LEDs that emit different colors of light, which, when combined, produce white light. More particularly, the combined outputs of the multiple LEDs that emit different colors of light can have an x,y chromaticity coordinate that is close to the chromaticity coordinate of the white point of a standard red, green, blue color space. For example, the CIE1931 x,y chromaticity coordinate of the combined output of the different LEDs can be x=0.26–0.32 and y=0.28–0.34.

Figure 2:
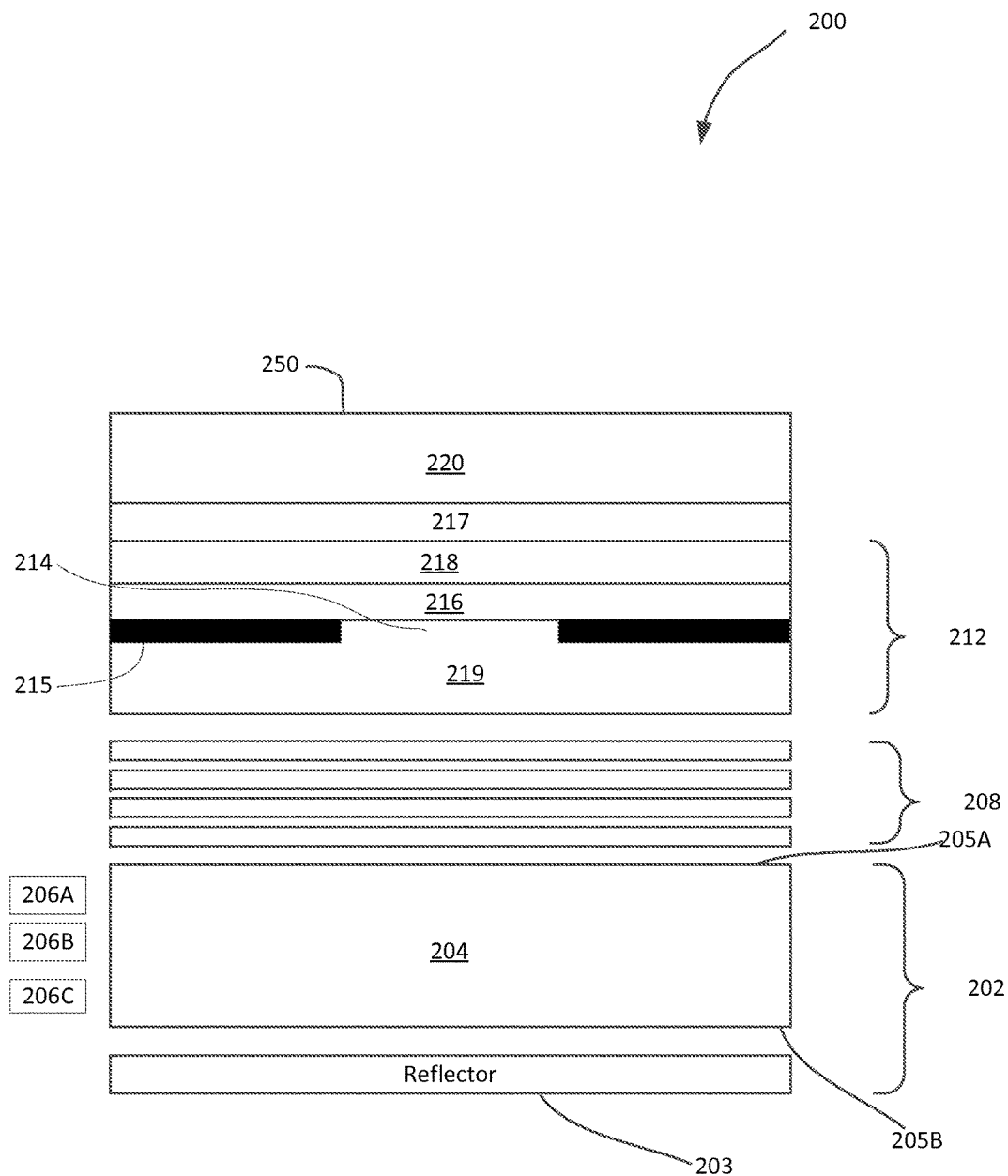
FIG. 2 is an example cross-sectional schematic diagram of pixel element of an MEMS-based field-sequential device.

FIG. 2 is an example cross-sectional schematic diagram of pixel element of an MEMS-based field-sequential device 200. The pixel element can include backlight section 202 and a MEMS-based shutter section 212. The backlight section 202 can include a transparent light guide panel (LGP) 204 that can include glass, plastic, polymer, etc. material, which can transmit or guide light from a plurality of edge- or rear-mounted light sources 206A, 206B, 206C. The light sources 206A, 206B, 206C, each provide a different color of light, which, when combined in different amounts, can produce a spectrum of colors visible to the human eye. For example, in one implementation, the light sources 206A, 206B, 206C can provide red, green, and blue light, respectively, which can be used in combination to produce a wide variety of different colors. Four-color schemes are also possible.

In the example implementation shown in FIG. 2, the light sources 206A, 206B, 206C are edge-mounted, in that the light sources are mounted proximate to an edge of the LGP 204, so that the light from the sources 206A, 206B, 206C is coupled into the LGP 204 through an edge of the LGP and can traverse the LGP to a top surface 205A of the LGP 204, which can include a reflecting surface to re-direct light impinging on the surface 205A back into the LGP 204. Light can also strike a bottom surface 205B of the LGP, where the bottom surface 205B can include a reflecting surface to re-direct impinging light back into the LGP 204. Light that escapes through the bottom surface 205B can be reflected by a reflector 203 below the bottom surface 205B and redirected into the LGP 204. In an example back-lit implementation (not shown), the light sources 206A, 206B, 206C can be mounted proximate to the bottom surface 205B of the LGP 204 and coupled through the bottom surface 205B into the LGP. In the backlit implementation, both side surfaces of the LGP can include reflecting surfaces to redirect light into the LGP 204.

As described above, with reference to FIG. 2, the LGP 204 is coupled to a film stack 208 that extracts light from the LGP and directs the light toward the display surface 250 of the LCD pixel element 200.

The MEMS-based shutter section 212 can include one or more transparent apertures 214 associated with each pixel element, though which light from the backlight section can pass. The one or more apertures can be defined by an opaque material 215 that is disposed on transparent plate 219, where an opening in the opaque material 215 defines the aperture 214. The bottom surface of the opaque material, which faces the LGP 204 can be reflective, so that any light from the LGP that strikes the bottom surface of the opaque material is reflected back into the LGP, where it can be redirected upward through the pixel element and possibly through the aperture 214. One aperture 214 is shown in FIG. 2, but more than one aperture per pixel element may be defined by the opaque material.

The MEMS-based shutter section 212 can include an active matrix backplane layer 216 and a MEMS-based shutter 218. The active matrix backplane layer 216 may include thin film transistors (TFTs) disposed on the transparent plate 219, where the TFTs can be electronically activated to mechanically move the MEMS-based shutter 218 that is coupled to the TFTs. For example, the shutter 218 can be opaque and can be operated to mechanically move horizontally, as seen in in FIG. 2, to cover, or leave open, the aperture 214, so that light from the backlight layer 204 can be blocked from passing through to the top of the pixel element or can be transmitted through to the top of the pixel element, respectively. The TFT layer 216 and the MEMS shutter 218 can be fabricated on the transparent plate 219 using standard TFT LCD manufacturing equipment, processes, and materials, with the MEMS shutter being built on top of the active backplane. The transparent plate 219 upon which the aperture 214, the TFT layer 216, and the MEMS shutter 218 are fabricated can be coupled to the film stack 208 and the backlight layer 202—e.g., by bonding or by a mechanical framework or fastening. The transparent plate 219 upon which the TFT layer 216 and the MEMS shutter 218 are fabricated can be bonded to the backlight layer 102 without any layer within the MEMS-based shutter section 212 that induces a preferential polarization of the light received from the LGP and without any intermediate layer between the transparent plate 219 and the backlight layer 202, which induces a preferential polarization of the light.

The pixel element 200 can include a cover glass layer 220 above the MEMS-based shutter section 212. The cover glass layer 220 can be coupled to the MEMS-based shutter section 212 by a liquid filled gap 217 that helps to overcome the effects of stiction of mechaniacal elements within the shutter 218 of the MEMS-based shutter section 212 and reduces optical losses. Edges seals at the edge of the display that includes thousands or millions of pixel elements 200 can contain the liquid within the gap.

In some implementations, the cover glass layer 220 can be formed of material that is optimized to serve as a cover and that is hard, scratch resistant, and has anti-reflection and oleophobic properties. In some implementations, the cover glass layer 220 can have a Mohs hardness rating of greater than 6.7. In some implementations, the glass layer 220 can have a Vickers hardness test rating of greater than 620. In some implementations, the hard transparent glass layer 220 can be fabricated by immersing an alkali-aluminosilicate sheet in a molten alkaline salt bath and using ion exchange to produce compressive residual stress in that the surface of the sheet. This process prevents cracks from forming in the glass layer 220, because for a crack to form it would first have to overcome the compressive stress in the sheet. The cover glass layer 220 can be coupled to the MEMS-based shutter section 212 without any color filter layer between the cover glass layer 220 and the MEMS-based shutter section 212. Because there is not a strict tolerance for alignment between the cover glass layer 220 and features of the MEMS-based shutter section 212 (e.g., the TFTs or the aperture of the shutter section 212), the cover glass layer 220 can be made of materials that differ from the materials used for the transparent layer 219 and that have different mechanical properties (e.g., coefficients of thermal expansion). For example, the coefficient of thermal expansion of the cover glass layer 220 can be between $75\times10^{-7}/°$ C. and $100\times10^{-7}/°$ C. and the coefficient of thermal expansion of glass used in the MEMS-based shutter section 212 can be less than $50\times10^{-7}/°$ C.

As light traverses, and reflects within, the LGP 204, it can be scattered out of the LGP 204 such that it propagates upward though the pixel element 200 into the MEMS-based shutter section 212 through the aperture 214. The shutter 218, which is coupled to the TFT layer 216, can be actuated to allow or prevent the light from passing up through the pixel element 200 and out through the cover glass layer 220.

The different color light sources 206A, 206B, 206C can be turned on and off sequentially to operate the pixel element in a field-sequential mode. To prevent color breakup, the light sources 206 can be sequentially turned on and off at a rate greater than the minimum 60 Hz frame rate. In some implementations, the light sources 206 can be turned on and off at a rate greater than 250 Hz (i.e., in a cycle of turning on and off all of the light sources, each light source can be turned on for less than 4 ms, and a cycle of turning on and off each light source of three light source system can take less than 12 ms). Then, the shutter 218 can be operated to prevent or allow light from the different light sources to pass through the shutter 218 and out through the cover glass 220. By allowing different amounts of light from the different colored light sources to be emitted from the pixel element, and by cycling the sequence of activation of the different light sources so much faster than the rate at which the human eye and brain can respond, the pulses of different colors of light can be perceived by a human being as a single color of light, which is a combination of the different pulses. Different pixel elements of the display can be controlled independently, so that a color image can be rendered by the device. When rendering a video signal that has a frame rate of less than the rate at which the light sources 206 are cycled, individual frames of the video signal can be rendered multiple times in succession.

In some implementations, the light sources 206 may be operated in lower frequency modes. For example, when the device 200 could be used in a monochome mode in which the light sources do not need to be turned on and off at a rapid rate. In another example, the device could be used in a book reading mode in which the light sources are operated in a high frequency burst mode during page changes but otherwise is operated in a low frequency mode when static text of a page is displayed.

Figure 3:
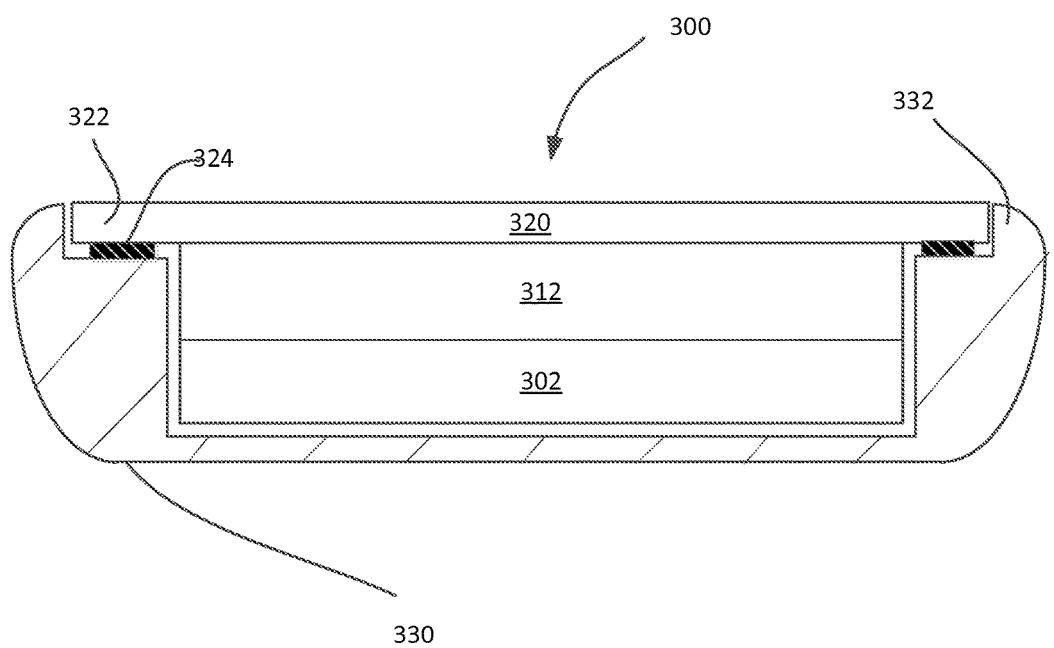
FIG. 3 is a schematic diagram of a field-sequential display device that includes many individual pixel elements housed in a structure that contains the optical and electrical elements of the display.

FIG. 3 is a schematic diagram of a field-sequential display device 300 that includes thousands or millions of individual pixel elements housed in a structure that contains the optical and electrical elements of the display. Individual pixel elements can be arranged adjacent to other pixel elements, and each pixel element can be controlled to display a desired color and brightness, such that full-color static and video images can be displayed on the device 300.

The display device 300 can include a MEMS-based shutter layer 312 that includes the MEMS-based shutter sections of the individual pixel elements and a backlight layer 302 that supplies individual color components of light to the active pixel layer 312. Each pixel element can be controlled in conjunction with control of the individual light sources that supply light to the backlight layer 302 to generate a desired image or video display on the device. For example, as explained above, in the backlight layer light sources having different colors can be sequentially turned on and off at rates that are rapid compared to the response rate of the human eye, and in the MEMS-based shutter layer 312 the MEMS-based shutters associated with different pixel elements can be opened and closed at appropriate times when the different light sources are turned on to allow a particular amount of light of a particular color to be displayed from each pixel element. Because the pulses of different colors of light are short compared to the response rate of the human eyes the pulses of light from the different color sources are combined from the perspective of a human viewer. In this matter, a desired image can be displayed by the display device 300. This process can be repeated, with different colors and/or brightnesses of light applied to the different pixel elements of the display, so that a video image can be displayed.

The display device can include a protective cover glass 320, similar to cover glass layer 220, that covers all of the individual pixel elements of the display device 300. The glass cover layer 330 can be stacked over the MEMS-based shutter layer 312 without any intermediate layer between the cover glass layer 330 and the MEMS-based shutter layer 312 that is configured to filter constituent spectral ranges of light from the backlight layer 302 layer. For example, the glass cover layer 330 can be bonded to the MEMS-based shutter layer 312, or can be adhered to the layer 312 with a transparent adhesive, or can be otherwise disposed above the layer 312, without or without an intermediate layer between them. However, an intermediate layer configured to filter spectral ranges of light is not needed because the color of light emitted from a pixel is controlled by controlling the pulsing of the different color light sources in conjunction with control of the MEMS-based shutter associated with the shutter.

In addition, the MEMS-based shutter layer 312 can be stacked over the backlight layer 302 without any intermediate layer configured to polarize light from the backlight layer being located between the MEMS-based shutter layer 312 and the backlight layer 302. For example, the MEMS-based shutter layer 312 can be bonded to the backlight layer, or can be adhered to the layer 312 with a transparent adhesive, or can be otherwise disposed above the layer 312, without or without an intermediate layer between them. However, an intermediate layer located between the MEMS-based shutter layer 312 and the backlight layer 302 to polarize light from the backlight layer is not needed, because light from the light source(s) associated with the backlight layer does not need to be polarized to control the intensity or color of light passing through a pixel element. By eliminating various intermediate layers from the stack, the device 300 can be relatively thin, which may be advantageous to save weight in the device and to provide an attractive device for the user.

As shown in FIG. 3, the lateral extent of the cover glass layer 320 may be wider than the lateral extent of the MEMS-based shutter layer 312 and the backlight layer 302. In particular, the cover glass layer 320 may include a flange 322 that extends laterally outward in a plane of the layer 320 beyond the edge 314 of the MEMS-based layer 312. The flange 322 can have having a lower surface that can be coupled to the housing 330 of the device 300 by a coupler 324 (e.g., an adhesive layer, a bonding, or a mechanical fastener) to hold the entire display device within its housing 330. Because the flange 322 of the cover glass layer 320 can be coupled directly to the housing 330 of the device 300, the width of the bezel 332 of the housing can be relatively narrow, thus giving the device 300 a pleasing visual appearance, in which the glass layer 320 extends nearly the full width of the device.

Figure 4:
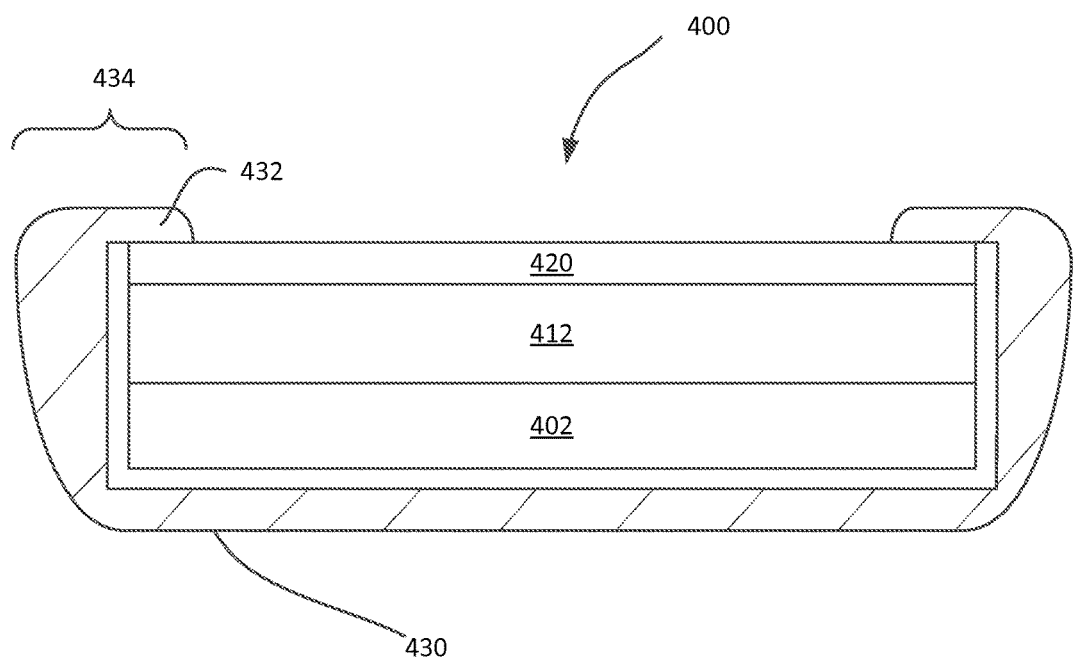
FIG. 4 is a schematic diagram of another field-sequential display device that includes many individual pixel elements housed in a structure that contains the optical and electrical elements of the display.

FIG. 4 is a schematic diagram of another field-sequential display device 400 that includes thousands or millions of individual pixel elements housed in a structure that contains the optical and electrical elements of the display. The optical and electical components of the device 400 are similar to those of device 300, but the mechanical arrangement of the device 400 in the housing 430 is different from the mechanical arrangement of the device 300 in the housing 330. As shown in FIG. 4, the lateral extent of the cover glass layer 420 is approximately the same as the lateral extent of the MEMS-based shutter layer 412 and the backlight layer 402. In particular, the cover glass layer 420 is covered by a lip 432 of the housing, which can be bonded to a perimeter of the glass 420 to secure the display device into the housing 430. Because the flange lip 432 extend inward over the perimeter of the glass layer 420, the bezel 434 of the housing 430 is can be relatively wider compared to the bezel in FIG. 3.

Figure 5:
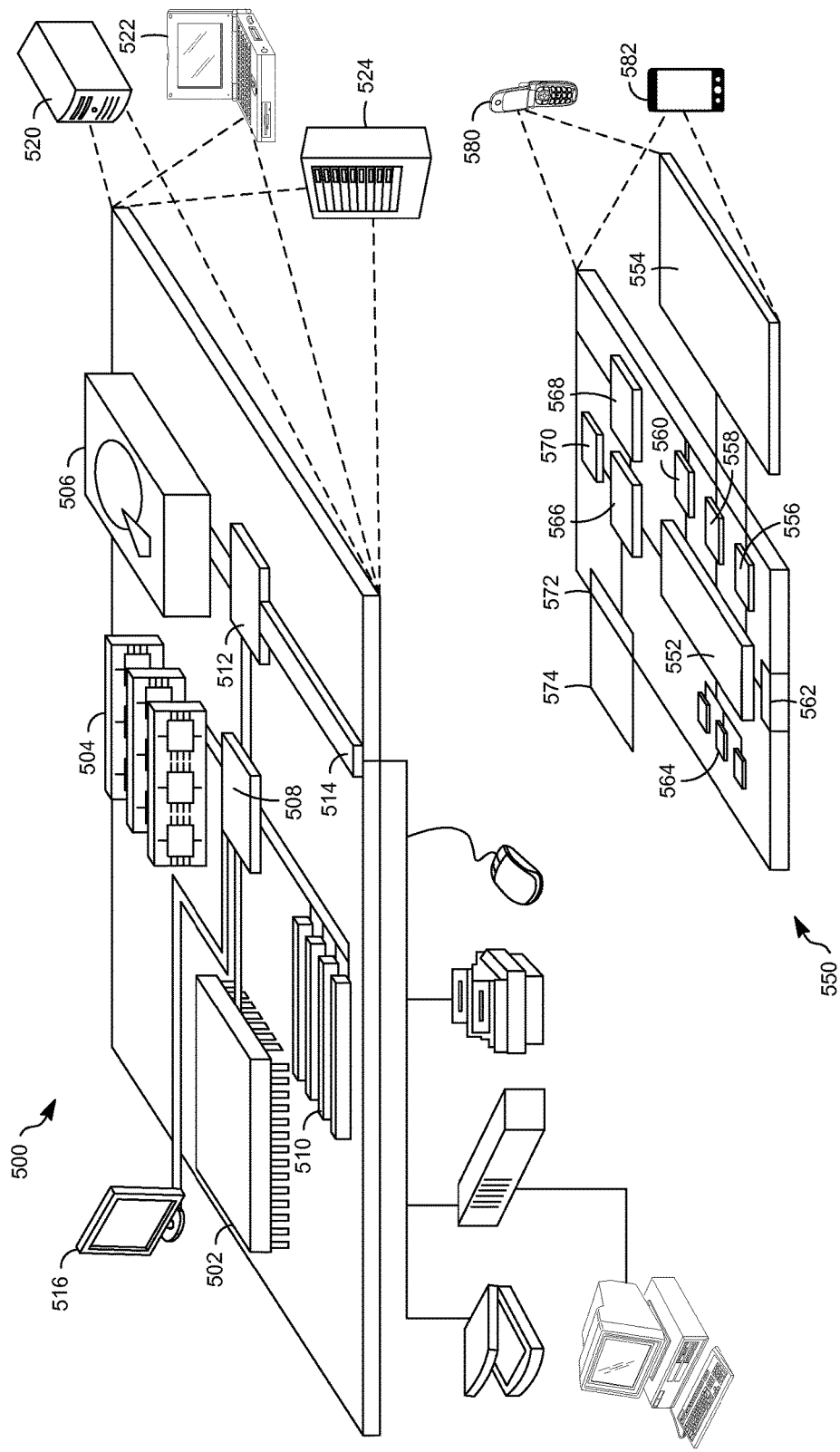
FIG. 5 shows an example of a generic computer device and a generic mobile computer device, which may be used with the techniques described here.

FIG. 5 shows an example of a generic computer device 500 and a generic mobile computer device 550, which may be used with the techniques described here. Computing device 500 is intended to represent various forms of digital computers, such as laptops, desktops, tablets, workstations, personal digital assistants, televisions, servers, blade servers, mainframes, and other appropriate computing devices. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. The processor 502 can be a semiconductor-based processor. The memory 504 can be a semiconductor-based memory. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter. The display 516 can incorporate aspects of the display device described above with respect to FIGS. 1-4, and the processor 502 can control the provision of the different colored light from one or more light sources to the backlight layer and can control, in co-ordination with the control of the provision of the different colored light, the passage of light from the backlight layer through the plurality of pixel elements to provide a predetermined image on the display.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display 554 can incorporate aspects of the display device described above with respect to FIGS. 1-4, and the processor 552 can control the provision of the different colored light from one or more light sources to the backlight layer and can control, in co-ordination with the control of the provision of the different colored light, the passage of light from the backlight layer through the plurality of pixel elements to provide a predetermined image on the display. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, television, tablet, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An apparatus comprising:
a backlight layer configured for diffusing light received into the backlight layer;
one or more light sources configured to provide light having at least three different colors to the backlight layer;
a MEMS-based shutter layer that includes a plurality of pixel elements, each pixel element being associated with at least one MEMS-based shutter that is programmably controlled to allow light from the backlight layer to pass through the shutter layer when the MEMS-based shutter is in an open configuration and to block light from the backlight layer from passing through the shutter layer when the MEMS-based shutter is in a closed configuration;
a processor configured to control the provision of the different colored light from the one or more light sources to the backlight layer and configured to control, in co-ordination with the control of the provision of the different colored light, the passage of light from the backlight layer through the plurality of pixel elements to provide a predetermined image on the display apparatus; and
a hard, scratch resistant cover glass layer stacked above the MEMS-based shutter layer,
wherein the MEMS-based shutter layer is stacked above the backlight layer without any intermediate layer that is configured to polarize light from the backlight layer between the MEMS-based shutter layer and the backlight layer,
wherein the cover glass layer includes a flange extending laterally outward in a plane of the cover glass layer beyond an edge of the MEMS-based shutter layer, wherein the flange is mechanically coupled to the housing, and
wherein the cover glass layer is stacked above the MEMS-based shutter layer without any intermediate layer that is configured to filter constituent spectral ranges of light from the backlight layer between the MEMS-based shutter layer and the cover glass layer.

2. The apparatus of claim 1, wherein the cover glass layer comprises Sapphire.

3. The apparatus of claim 1, wherein the cover glass layer comprises an alkali-aluminosilicate material that has been treated to produce residual compressive stress in the material.

4. The apparatus of claim 1, wherein the cover glass layer has a Mohs hardness rating of greater than 6.

5. The apparatus of claim 1, wherein the cover glass layer has a Vickers hardness test rating of greater than 620.

6. The apparatus of claim 1, further comprising a housing, the cover glass layer being mechanically coupled to the housing to secure the cover glass layer in the housing.

7. The apparatus of claim 1, wherein a bezel of the housing surrounds the flange.

8. The apparatus of claim 1, further comprising a liquid layer between the cover glass layer and the MEMS-based shutter layer.

9. The apparatus of claim 1, wherein the MEMS-based shutter layer includes a transparent glass material that is less hard than the cover glass layer.

10. The apparatus of claim 1, wherein the cover glass layer includes touch-sensitive components configured to receive a user input via a touch by the user of the cover glass layer.

11. The apparatus of claim 1, wherein a coefficient of thermal expansion of the cover glass layer is between $75 \times 10^{-7}/°$ C. and $100 \times 10^{-7}/°$ C. and a coefficient of thermal expansion of glass used in the MEMS-based shutter layer is less than $50 \times 10^{-7}/°$ C.

12. A computing device comprising:
a display, the display including:
a backlight layer configured for diffusing light received into the backlight layer,
one or more light sources configured to provide light having at least three different colors to the backlight layer,
a MEMS-based shutter layer that includes a plurality of pixel elements, each pixel element being is associated with at least one MEMS-based shutter that is programmably controlled to allow light from the backlight layer to pass through the shutter layer when the MEMS-based shutter is in an open configuration and to block light from the backlight layer from passing through the shutter layer when the MEMS-based shutter is in a closed configuration, the MEMS-based shutter layer being mechanically coupled to the backlight layer, and
a hard, scratch resistant cover glass layer stacked above the MEMS-based shutter layer, the cover glass layer being mechanically coupled to the MEMS-based layer,
wherein the MEMS-based shutter layer is stacked above the backlight layer without any intermediate layer that is configured to polarize light from the backlight layer between the MEMS-based shutter layer and the backlight layer, and wherein the cover glass layer is stacked above the MEMS-based shutter layer without any intermediate layer that is configured to filter constituent spectral ranges of light from the backlight layer between the MEMS-based shutter layer and the cover glass layer;

wherein the cover glass layer includes a flange extending laterally outward in a plane of the cover glass layer beyond an edge of the MEMS-based shutter layer, wherein the flange is mechanically coupled to the housing;

a housing, the cover glass layer being mechanically coupled to the housing to secure the cover glass layer in the housing; and a processor, the processor configured to control the provision of the different colored light from the one or more light sources to the backlight layer and configured to control, in cordination with the control of the provision of the different colored light, the passage of light from the backlight layer through the plurality of pixel elements to provide a predetermined image on the display.

13. The apparatus of claim 12, wherein a bezel of the housing surrounds the flange.

14. The apparatus of claim 12, wherein the MEMS-based shutter layer includes a transparent glass material that is less hard than the cover glass layer.

15. The apparatus of claim 12, wherein the cover glass layer includes touch-sensitive components configured to receive a user input via a touch by the user of the cover glass layer.

16. The apparatus of claim 12, wherein a coefficient of thermal expansion of the cover glass layer is between $75 \times 10^{-7}/° C.$ and $100 \times 10^{-7}/° C.$ and a coefficient of thermal expansion of glass used in the MEMS-based shutter layer is less than $50 \times 10^{-7}/° C.$ 17. The apparatus of claim 12, wherein the cover glass layer has a Mohs hardness rating of greater than 6.

18. The apparatus of claim 12, wherein the cover glass layer has a Vickers hardness test rating of greater than 620.

* * * * *